UNITED STATES PATENT OFFICE.

STEWART E. SEAMAN, OF NEW YORK, N. Y.

PIGMENT CARBON DERIVED FROM VEGETABLE PITH.

1,379,222.      Specification of Letters Patent.      Patented May 24, 1921.

No Drawing.      Application filed November 3, 1919. Serial No. 335,374.

*To all whom it may concern:*

Be it known that I, STEWART E. SEAMAN, a citizen of the United States, and a resident of the city, county, and State of New York, have invented a new and useful Improvement in Pigment Carbons derived from Vegetable Pith, of which the following is a full, clear, and exact description.

My invention relates to an improved product in the form of a pigment derived from vegetable pith. More specifically my invention relates to such a pigment derived from the pith of corn cobs. I have found that by carbonizing the pith of corn cobs I produce a black pigment which can be worked as readily as lamp-black, and which has many of the characteristics of graphite, that is to say, the pigment is greasy to the touch, and is infinitesimal in size. In producing this black vegetabe pigment, the corn cob pith can be carbonized in any suitable retort, and the pith can first be separated from the cob, or the cob and pith can be carbonized together either whole or suitably ground, and where carbonized together the pith carbon can be separated from the surface or woody carbon in the form of charcoal by winnowing, flotation, or by any suitable mechanical means.

My experiments have been made mostly with the corn cobs, and I find that the pith of the corn cob makes a black pigment having the characteristics specified, but I do not wish to confine my invention to the product derived from the corn cob pith, as the pith derived from the stems and branches and other parts of exogenous plants can be treated in a similar way to produce the fine black pigment desired. For instance, I have found that the pith from sugar-cane works nicely to produce the pigment desired. The pith can be obtained in any well known or preferred way. For example in the manufacture of corn cob pipes the pith is punched from the cobs and can be saved for this purpose. In the manufacture of alcohol from corn cobs, the cobs are broken up in a beater in water, and the pith being lightest, rises to the top and is skimmed off. Likewise with sugar-cane. This is beaten up in a beater such as is used in paper making, and the pith separates, rises to the top, and is skimmed off.

The corn cob pitch is most desirable, however, because it not only produces the desired quality of black pigment in charcoal form, but it can be most advantageously produced because the corn cobs are essentially a waste product, and they can be had in practically unlimited quantities.

I claim:—

1. As a new product, pigment carbon derived from vegetable pith.

2. As a new product, pigment carbon derived as charcoal from the pith of exogenous plants.

3. As a new product, pigment carbon derived as charcoal from the pith of corn cobs.

4. As a new product, vegetable pith pigment carbon characterized by being greasy to the touch and infinitesimal in size.

STEWART E. SEAMAN.

Witnesses:
    WARREN B. HUTCHINSON,
    M. G. O'DONNELL.